United States Patent [19]

Frazier

[11] Patent Number: 5,325,510
[45] Date of Patent: Jun. 28, 1994

[54] MULTIPROCESSOR SYSTEM AND ARCHITECTURE WITH A COMPUTATION SYSTEM FOR MINIMIZING DUPLICATE READ REQUESTS

[75] Inventor: Gary A. Frazier, Garland, Tex.

[73] Assignee: Texas Instruments Incorporated, Dallas, Tex.

[21] Appl. No.: 92,376

[22] Filed: Jul. 15, 1993

Related U.S. Application Data

[63] Continuation of Ser. No. 530,378, May 25, 1990, abandoned.

[51] Int. Cl.⁵ .................... G06F 13/14; G06F 12/00
[52] U.S. Cl. ........................... 395/425; 395/800; 395/27; 364/DIG. 2; 364/916; 364/916.2; 364/964.2; 364/964.27; 364/972.4
[58] Field of Search ............ 395/11, 21, 27, 250, 395/375, 425, 600, 725, 400, 425, 27, 800

[56] References Cited

U.S. PATENT DOCUMENTS

| | | | |
|---|---|---|---|
| 4,142,234 | 2/1979 | Bean et al. | 395/425 |
| 4,707,781 | 11/1987 | Sullivan et al. | 395/425 |
| 4,870,571 | 9/1989 | Frink | 395/200 |
| 4,969,088 | 11/1990 | McAuliffe et al. | 395/325 |
| 4,974,169 | 11/1990 | Engel | 395/11 X |
| 5,058,006 | 10/1991 | Durdan et al. | 395/325 |

OTHER PUBLICATIONS

Ralston, Anthony, "Encyclopedia of Computer Science," 1976, pp. 1187–1189.

Primary Examiner—Paul V. Kulik
Attorney, Agent, or Firm—Ruben C. DeLeon; Stanton C. Braden; William E. Hiller

[57] ABSTRACT

Hierarchical multiprocessors systems with common level expansion modules. The invention includes an architecture for such multiprocessor system. One facet of such multiprocessor system including a memory control system for minimizing duplicate read requests comprising: a plurality of processing systems; a bus connecting the processing systems; a memory for storing variables; circuitry operable for receiving read requests through the bus from other processing systems; a memory for queuing incoming read requests, wherein the memory for queuing incoming read requests is connected to the circuitry operable for receiving read requests; a memory for queuing outgoing read requests, wherein the memory for queuing outgoing read requests is connected to bus and the memory for storing variables; and circuitry for comparing the incoming read requests to the queued read requests, wherein the circuitry ignores duplicates of a first read request prior to the first read request leaving the memory for queuing outgoing read requests.

19 Claims, 8 Drawing Sheets

ONE OF THE 4 DIRECT MODULE-TO-MODULE PORTS

MULTIPROCESSOR SYSTEM AND ARCHITECTURE WITH A COMPUTATION SYSTEM FOR MINIMIZING DUPLICATE READ REQUESTS

This application is a continuation of application Ser. No. 07/530,378 filed May 25, 1990, abandoned.

BACKGROUND OF THE INVENTION

1. Field of the Invention

The present invention relates to electronic computers, and, more particularly, to control in multiprocessor systems.

2. Description of the Related Art

Attempts to understand the functioning of the human brain have led to various "neural network" models in which large numbers of simple computing elements ("neurons") are interconnected (by "synapses") to form a connectionist machine. As with all connectionist machines, neural networks use fine-grained parallelism to perform complex functions at very high speed. This high effective computing bandwidth can be applied to compute-bound problems such as finite-element analysis, image processing, adaptive signal processing, constrained optimization, associative memory, and artifical intelligence.

Neural network models roughly presume each neuron can exist in one of two states (quiescent and firing) with the state determined by the states of directly-connected neurons (e.g., if enough directly-connected neurons are firing, then the original neuron should switch to or be in the firing state). The models may be simple feedforward layered structures with an input layer of neurons, one or more hidden layers of neurons, and an output layer of neurons. Other models have feedback among the neurons and correspondingly more involved behavior.

The structure of any neural network can be defined by directed graphs as illustrated in FIG. 1. The vertices of the graph represent the computing elements and have associated parameters, and the edges of the graph define the communication paths among the computing elements and also have associated paramenters. Also, input and output paths connected to each vertex are shown. A vertex and its associated parameters define a neuron (labelled $N_j$) and an edge with its associated parameters define a synapse (labelled $S_{ij}$ for the path from $N_j$ to $N_i$) between neurons. The synapses are not just communication paths, but also modify the signals propagated between neurons. If we assume that a synapse value of zero (e.g., $S_{ij}=0$) corresponds to an absence of connection between neurons (e.g., from $N_j$ to $N_i$), then any neural network configuration may be represented more generally by a complete graph of N neurons together with $N^2$ synapses. Most neural networks do in fact have on the order of $N^2$ connectivity, so the number of parameters required to define a network state increases as a power of the size of the model.

The output of a neuron is a function of its internal state plus the inputs it receives from its synaptic connections. Each neuron is defined to receive an external input, serve as an external output, or be externally inaccessible (hidden). Neurons need not operate synchronously, have uniform connectivity, nor obey the same rules for change of state. The state of a neuron by a simple numerical value or by more complex data structures.

For example, J. Hopfield, Neural Networks and Physical Systems with Emergent Collective Computational Abilities, 79 Proc. Natl. Acad. Sci. USA 2554 (1982) describes a neural network model with N neurons each of which has the value 0 or 1 (corresponding to the quiescent state or to the firing state, respectively), so the state of the network is then an N-component vector $V=[V_1, V_2, \ldots, V_N]$ of 0's and 1's which depends upon time. The neuron interconnections are described by a matrix $S_{i,j}$ defining the influence of the $j^{th}$ neuron on the $i^{th}$ neuron. The state of the network evolves in time as follows: each neuron i has a fixed threshold $\theta_i$ and readjusts its state $V_i$ randomly in time by setting $V_i$ equal to 0 or 1 depending on whether $$\sum_j S_{i,j} V_j - \theta_i$$

is negative or positive. All neurons have the same average rate of readjustment, and the readjustments define a dynamical flow in state space.

With the assumption that $S_{i,j}$ is symmetric, the potential function $$\sum_i \sum_j S_{i,j} V_i V_j$$

can be used to show that the flow of the network is to local minima of the potential function. Further, with a given set of uncorrelated N-component vectors $U^1$, $U^2$, $\ldots$, $U^8$, a $S_{i,j}$ can be defined by $$S_{i,j} = \sum_{1 \leq k \leq s} (2U_i^k - 1)(2U_j^k - 1)$$

and with the thresholds equal to 0, these $U^k$ are the fixed points of the flow and thus stable states of the network. This is a type of "outer product storage" of the vectors $U^1, U^2, \ldots, U^8$. Such a network can act as a content-addressable memory as follows: the memories to be stored in the network are used to construct the $U^k$ and hence $S_{i,j}$, so the stored memories are fixed points of the flow. Then a given partial memory is input by using it to define the initial state of the network, and the state will flow usually to the closest fixed point/stable state $U^k$ which is then the memory recalled upon input of the partial memory.

Further analysis and modified network models appear in, for example, J. Hopfield et al, Computing with Neural Circuits: A Model, 233 Science 625 (1986) and J. Hopfield, Neurons with Graded Response Have Collective Computational Properties like Those of Two-State Neurons, 81 Proc. Natl. Acad. Sci. USA 3088 (1984).

Synapses are usually modified by a recursive algorithm that depends upon the local response of the network to a set of external inputs. After this "training" phase, the network can be used to perform a function by presenting certain neurons with input data and then allowing the network to evolve as previously described. Most algorithms allow very high internal parallelism during the "compute" phase and reach a near steady state in just a few propagation delays of information through the network.

For example, J. Anderson, Cognitive Capabilities of a Parallel System, NATO Advanced Research Workshop (Mar. 3, 1985) describes the Brain State in a Box (BSB) neural network model which includes outer-product storage, Widrow-Hoff learning, and a ramped-threshold recall algorithm. That is, the matrix of interconnection strengths, $S_{i,j}$, is modified to learn a new vector $V_j$ by $$\Delta S_{ij} = \frac{\eta}{N} \left[ \sum_{1 \leq k \leq N} S_{i,k} V_k - V_i \right] V_j$$

where $\eta$ is a learning constant and N is number of neurons. The learning constant is roughly the inverse of the number of times the matrix must be trained on a given vector before it fully learns the vector. The smaller the learning constant, the finer the resolution of the average direction for a learned state but the more times the input vectors must be trained. The learning procedure saturates when $\Delta S_{i,j}$ is close to zero, which implies that the vector is close to being an eigenvector of the matrix with an eigenvalue near 1.

Recall of a learned (stored) vector given an input vector $U_j$ is by the following iterative process that converges towards an eigenvector:

$$U_j(t+1) = \text{Limit} \left[ \gamma \sum_{1 \leq k \leq N} S_{j,k} U_k(t) + \beta U_j(t) \right]$$

where the "Limit" function clamps the values in the range from $-1$ to $1$. The constants $\gamma$ and $\beta$ measure the feedback and signal decay in the algorithm. This synchronous recall algorithm replaces the dynamical flow of the Hopfield model. The usual applications of the BSB neural network such as data bases with words and letters encoded as their ASCII representations require binary neurons as in the first Hopfield model.

A problem with neural networks is the lack of efficient nonbiological hardware. Further, the simulation of neural networks with standard digital computers demands extreme computing power. For example, consider a neural network composed of 256 by 256 fully interconnected neurons (large enough to assign one neuron to each pixel in a low-resolution video camera image) would contain over four billion synaptic connections. A real-time simulation of the processing of a single video frame by this network would require a minimum computing rate of over 250 billion synapse operations per second. And the number of parameters needed to define a neural network tends to grow as a power of the network size, and the communication cost in parallel processor computers overwhelms the computer.

SUMMARY OF THE INVENTION

The present invention provides a computer architecture with parallel processing adaptable to neural network simulations; the architecture includes heirarchical busses with groups of processor modules on backplane busses and groups of backplane busses connected to broadcast busses through modules having bus watcher circuitry to combine multiple references to a memory location in the processor modules and memory watcher circuitry to detect accesses to special global memory locations in the processor modules. This architecture permits expansion by additional processor modules and solves the neural network simulation problem of communication cost.

BRIEF DESCRIPTION OF THE DRAWINGS

The drawings are schematic for clarity.

DESCRIPTION OF THE PREFERRED EMBODIMENTS

Figure 1:
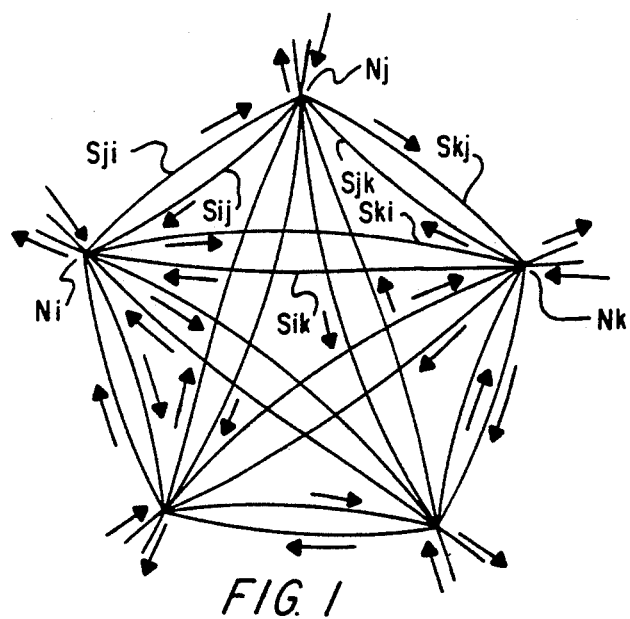
FIG. 1 shows neural network interconnections.

The basic parallel structure and operation of neural networks permits parallel processing methods for increased simulation performance compared to a single processor. The graphical analog in FIG. 1 shows explicit parallelism in the communication of neuron states across synapses. The modification of these signals by each synapse, and the change in the synapse values themselves are also an independent (parallel) operation in most algorithms. Perhaps most importantly, a N-neuron neural network contains only on the order of N global variables, namely, the N neuron states. The order of $N^2$ synapses can be treated as local parameters of each neuron and can in principle be integrated into the neuron states transition function. For the general case then, the simulation of neural networks requires very high levels of computing power, but that parallel processing can be applied.

The cost of communication among individual processors need not degrade the parallel simulation of neural networks as long as the communication cost is less than the cost of the parallel computation. For example, assume a neural network can be simulated in parallel by sharing the state of the neurons among P identical processors. Assume that each processor holds an equal portion of the network synapses, and that these parameters need not be shared during a simulation. If the average degree of connectivity between neurons is denoted by C, then the time needed to simulate a network of N neurons is roughly $CNT_c/P$ where $T_c$ is the average time to process one connection. The time required to communicate the state of the network to all processors is $NT_n$ where $T_n$ is the average time required to communicate the state of one neuron to all processors. Thus, if the ratio C/P is much greater than $T_n/T_c$ then the cost of communication between processors will not have a significant impact on performance. The values of C/P and $T_n/T_c$ can vary across systems and models by several orders of magnitude. However, both C and $T_c$ will usually increase with network size, and a sufficiently large network will saturate the processing resources and swamp out the effects of communication overhead.

Figure 2:
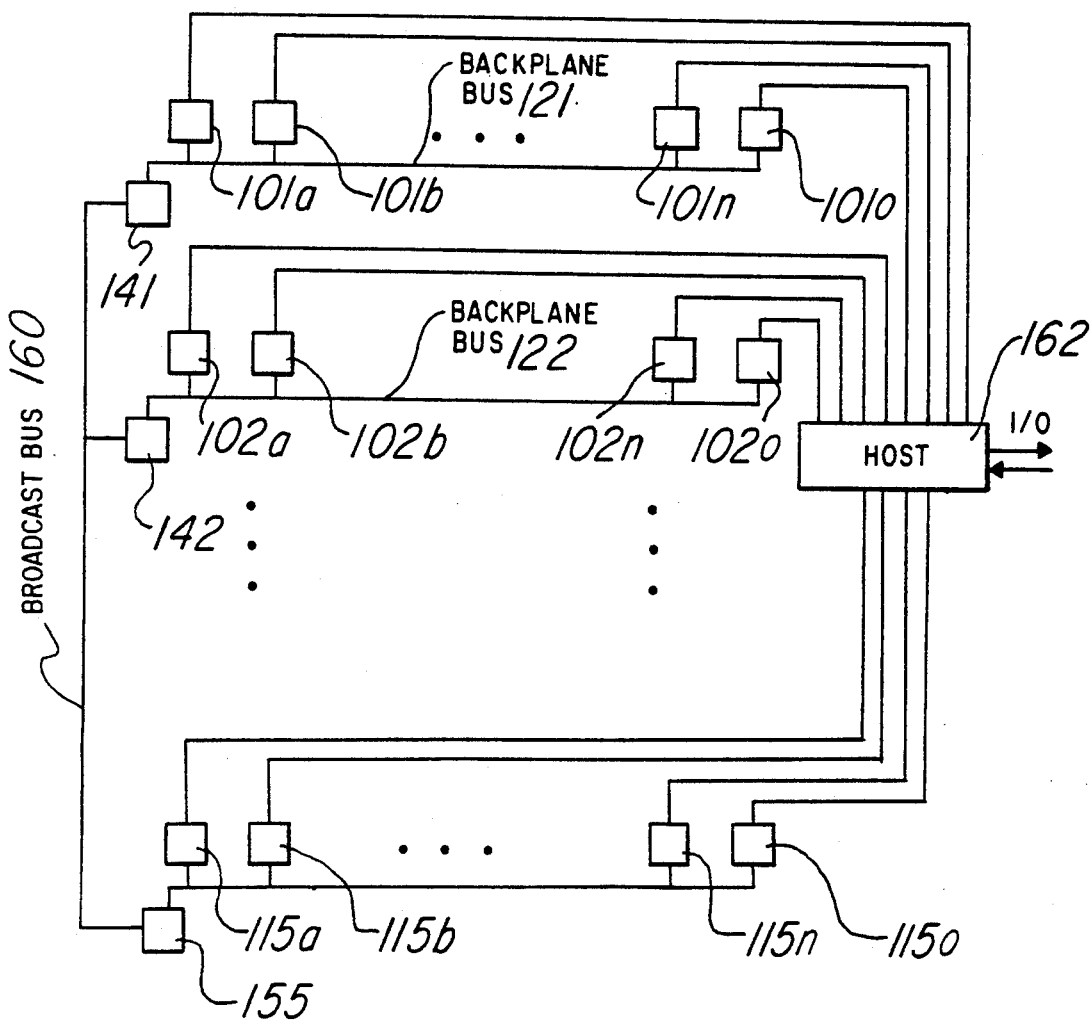
FIG. 2 illustrates a first preferred embodiment computer in block form.

FIG. 2 illustrates in block form a first preferred embodiment computer, generally denoted by reference numeral 100, which includes processing modules 101a, 101b, . . . , 101o, 102a, 102b, . . . , 102o, . . . , 115a, 115b, . . . , 115o, backplane busses 121, 122, . . . , 135, expansion modules 141, 142, . . . , 155, broadcast bus 160, and host interface 162. Each of these elements of computer 100 is as follows.

Figure 3:
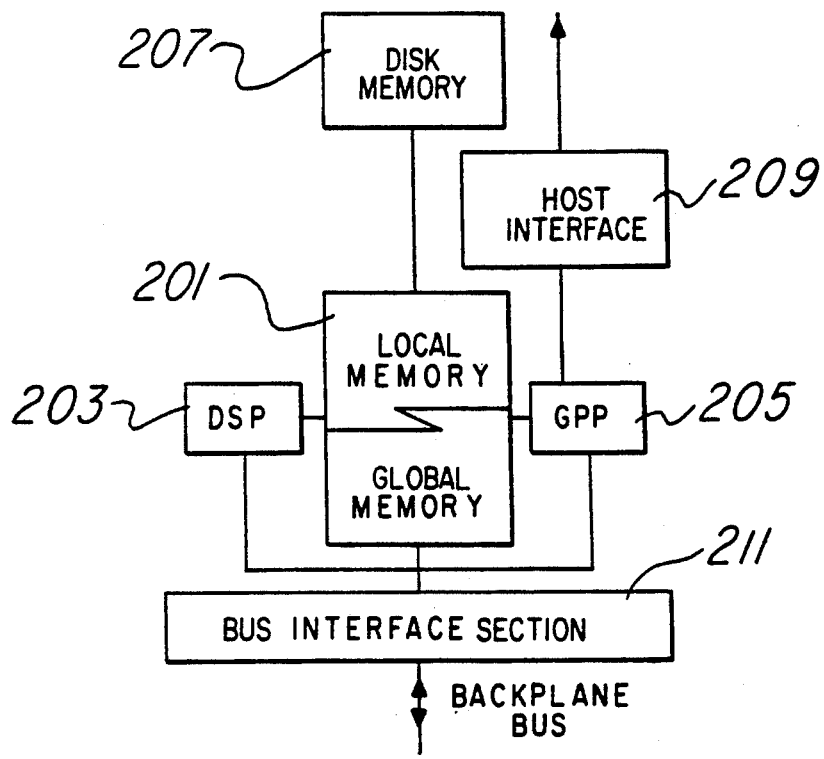
FIG. 3 shows a processing module.

(a) The processor modules 101a, ..., 115o are all identical and each is illustrated in block form in FIG. 3 and includes 128 megabyte semiconductor memory 201, 32-bit digital signal processor (such as a TMS320C30) 203, 32-bit general purpose processor (such as a MC68030) 205, 256 megabyte disk memory 207, host interface 209, and backplane bus interface 211. Digital signal processor 203 is used to carry out the high-speed portions of a simulation such as multiplications and additions. General purpose processor 205 runs an independent, UNIX-like operating system and manages the on-module resources including scheduling tasks for digital signal processor 203 and maintaining statistical information about module performance. General purpose processor 205 also handles communication with host 162 through interface 209. Semiconductor memory 201 is divided by a programmable partition into sections of local and global memory; local memory can be directly read or modified by the on-module processors 203 and 205 but is not shared among modules. The global memory section of semiconductor memory 201 can be directly read by any module, but is usually modified only by a bus transaction as described below. The local memory is physically interleaved so that four contiguous locations can be queued in parallel. A ping-pong switch is used to alternate between two such queues so that a block of memory locations can be accessed by digital signal processor 203 at full throughput. The ping-pong switch provides a maximum serial access rate to the local memory of 200 megabytes per second. The global memory is also interleaved to contentions between the module processors and the backplane bus. Contention is further reduced by using program and data caches at digital signal processor 203 and general purpose processor 205. To help maintain data coherency, all cached global data is non-writable or write-through. Disk memory 207 stores the operating systems, code libraries, and network parameters; and the total memory of 256 megabytes will, depending upon program size, allow a single processor module to hold up to thirty-two million single-precision network parameters in fast memory. Interface 211 includes FIFO memories to even out the rate of data flow into and out of the module and to minimize contention between the module and the bus.

(b) Backplane busses 121, 122, ..., 135 each have 32 data lines, 32 address lines, and 64 lines for protocol flags; so each of the fifteen processor modules plus one expansion module on a backplane bus may have four control lines assigned to it. The four control lines assigned to each module are Data Available, Space Available, Bus Request, and Bus Grant. The Data Available and Space Available flags are used by the bus controller to scan and serve the FIFOs of interfaces 211, and the Bus Request and Bus Grant flags are used by each module to vie for direct control of the backplane bus. One set of four lines is assigned to the expansion module on a backplane bus to permit global data broadcast out of or into the group of fifteen processor modules on a backplane bus. Bus arbitration is pipelined with the data transfers to allow the bus to operate as close as possible to its physical bandwith of 100 megabytes per second.

Figure 4:
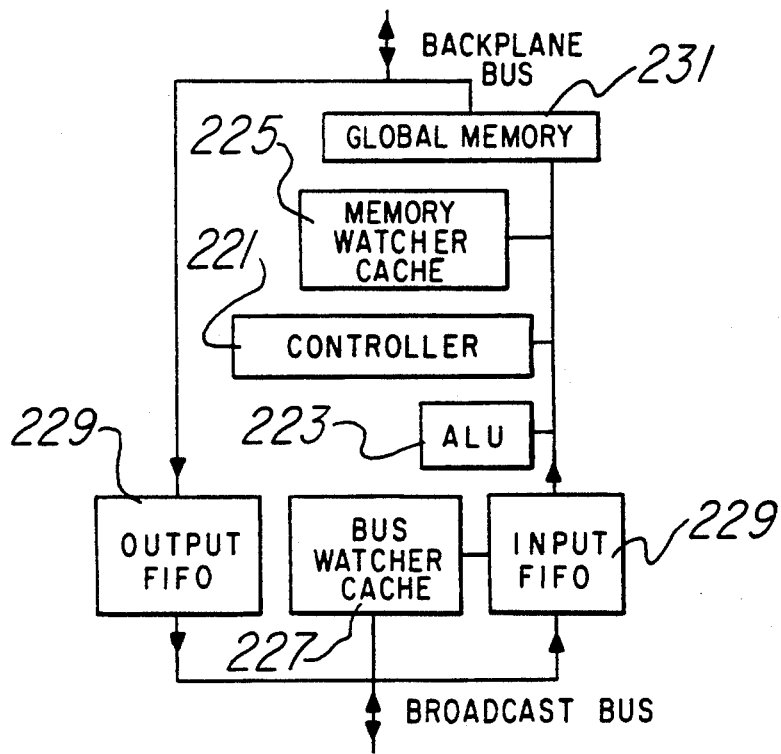
FIG. 4 shows an expansion module.

(c) Expansion modules 141, 142, ..., 155 are identical and each is illustrated in block form in FIG. 4 and includes microcontroller 221, arithmetic logic unit 223, memory watcher cache 225, bus watcher cache 227, bidirectional FIFO buffer 229 (shown as separate input and output FIFOs), and global memory 231. Microcontroller 221 manages one of several bus protocols used to arbitrate access by the expansion modules to the broadcast bus. Bidirectional FIFO 229 serves to even out the rate of data flow into and out of the expansion module and to minimize contention between the expansion module and the broadcast bus. Arithmetic logic unit 223 performs fixed-point arithmetic on the global memory as defined by bit patterns in the control field of data arriving from broadcast bus 160. Bus watcher cache 227 is used to combine multiple references to a memory location by deleting multiple requests to the same location until the response to the first request appears on broadcast bus 160.

Figure 5A:
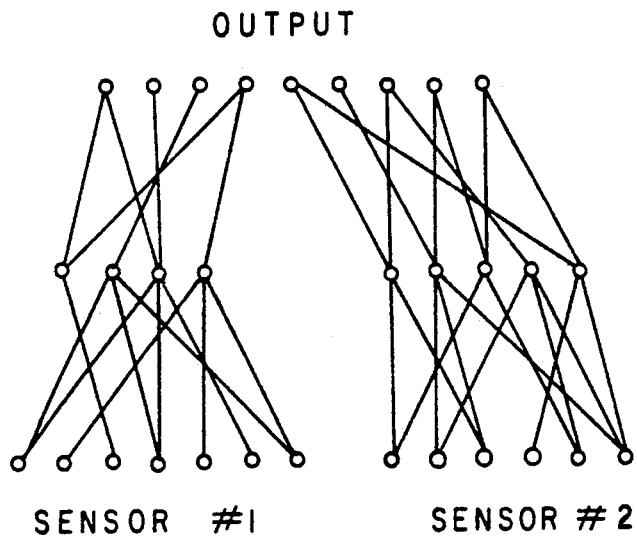
FIGS. 5a–b illustrate neural network simulation.
Figure 5B:
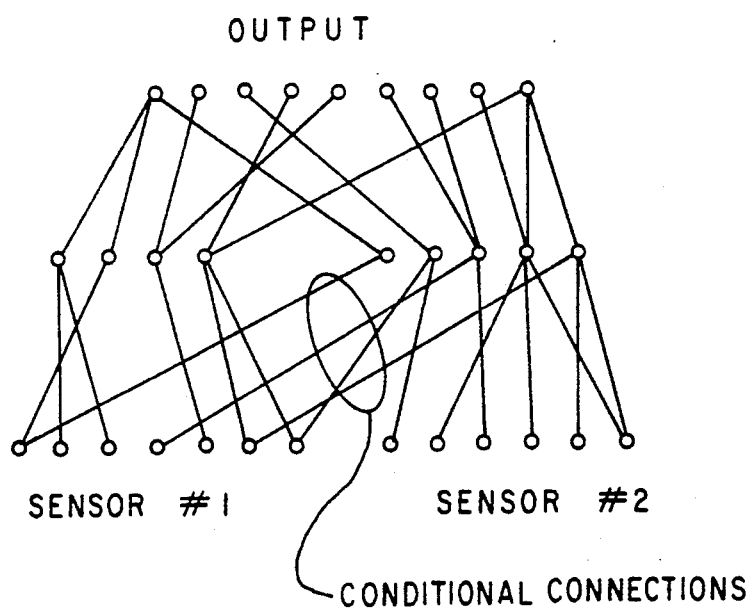

In complex neural network models several different networks and their algorithms are executed at various times during a simulation. For example, one neural network may be used to process information from a sensor #1, while a second network is used in parallel to process information from a second sensor #2. In model-based recognition systems, information that originates from an object or image is initially processed by several independent algorithms each of which generates an estimate of the type of object or scene being sensed. Thus, as shown heuristically in FIG. 5a object or image data arriving at different sensors is often processed separately and in parallel, yielding independent initial estimates of the properties or type of objects measured. The separate object or image properties obtained thereby are used to determine which algorithms should be then applied to the sensor data in order to improve the recognition accuracy or efficiency of the overall system. In a neural network model, the second level of information processing can take the form of adding additional interneuron connections between the initially distinct networks so that sensor data can be conditionally combined, or fused, as heuristically shown in FIG. 5b. Thus in a multistage process, several neural networks act independently, followed by a conditional coupling between the networks to provide an improved overall response.

In the simulation of these network types on the present embodiment, it can happen that initially, an optimal distribution of the many processors over the available simulation tasks are such that some module processors may not initially require access to the values of network variables that are located in the memory storage units of other modules. As in the example above, a processor that was originally responsible for simulating one neural network may at some later time require the value of neuron variables stored on other modules. Since it may not be possible to schedule the automatic transfer of these data between modules, it is more efficient for the module that requires the information to make a memory request for the data to the appropriate module. In practice, the requesting module loads its tag-field FIFO with a command that, when received by the appropriate module bus controlled, will read the desired memory location and transmit this data over the bus. As suggested by FIGS. 5a-b, if several processors on several modules simulate one neural network, and at some later time must request information stored in the memory units of other modules, then it is possible for very many modules to make essentially the same memory request simultaneously. For example, ten module processors may request the value of the same hundred neurons all within a short period of time.

The Bus watcher 227 is designed to minimize unnecessary communication over the broadcast bus by observing the memory requests that arrive at each module, and combining multiple memory requests to the same memory location. Since each module has a FIFO buffer for data entering and leaving the broadcast bus, a significant number of memory requests may become queued in the FIFO that receives bus data before the first request for memory is acted upon by the local bus controller. Moreover, since the bus interface contains an output FIFO, even more time may elapse before the answer to the memory request is clocked through the output FIFO and is broadcast over the bus. Thus, it is possible, and even likely, that many requests to the same memory location could be queued in each module interface buffer before the first request is actually satisfied.

Figure 6:
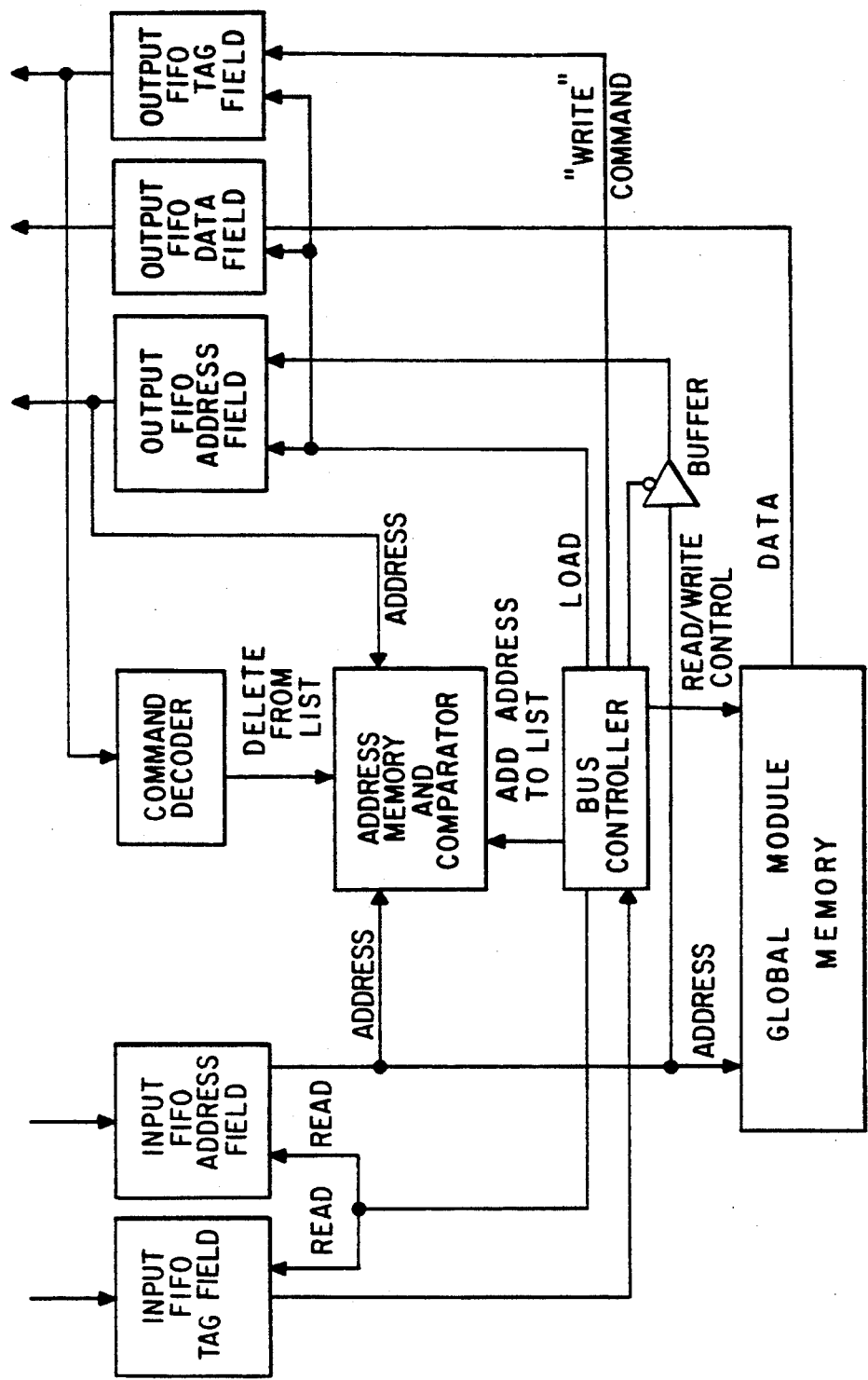
FIG. 6 shows the bus watcher.

The bus watcher 227 is illustrated in FIG. 6 and consists of a set of registers that store the address of the memory that is being requested as the request arrives over the broadcast bus. Storage is triggered when the command subfield of the tag field indicates a memory request operation. Once stored, the bus watcher compares this address with all address values read from the input address field FIFO. If an address has been stored, cached, and another memory request at the same address arrives, the second memory request is totally ignored. Thus, multiple memory requests for the same memory location are ignored. As soon as the first memory request filters through the input FIFO, the bus interface controller reads the data at the desired address and loads this data into the output FIFO. Once this answer to the original memory request is clocked onto the broadcast bus, the bus watcher must delete the cached memory address lest future memory requests be ignored incorrectly. The cache erasing process is accomplished by clearing the cache register that holds the request address as soon as this address appears on the broadcast bus and the command subfield of the tag field indicates a memory write operation is to be performed.

In parallel with the storage operation, the bus watcher circuitry observes the information being sent out by its parent module over the broadcast bus.

Memory watcher cache (MWC) 225 detects accesses to special global memory 231 locations by either arithmetic logic unit 223 or broadcast bus 160. A comparator is used with the cache to detect a match between a target value and a shared variable such as a process barrier counter. A match condition may be used to interrupt module processing or coordinate (synchronize) processes across modules.

The memory watcher cache 225 is used to alert the module processors when a multi-module task has been completed. Consider an iterative matrix-vector multiplication, quite common in neural network algorithms, where a matrix is to be multiplied by a vector, and the resulting vector used iteratively as a new vector in the matrix-vector product operation.

$$V(t+1) = M \times V(t); \text{ for several } t$$

Assuming a N by N matrix and a N component vector, N processors could be tasked to perform a single row-vector product in parallel, thus executing the required calculation at high speed. As each module computes the output vector component, this value is broadcast to other modules for future use. It is necessary in this process to provide a way to synchronize the actions of all modules so that each module knows when all other processors have completed their respective calculations and broadcast their results. One method for providing a synchronization mechanism is to have each processor increment a shared memory location as each subtask is completed. When this initially zero shared memory location holds a value of M, (which is less than N) then all modules know that M subtasks of a problem has completed. If the total number of subtasks for a problem is N, (as in the above example), then all processors know that the entire computation for that time step has completed.

Figure 7:
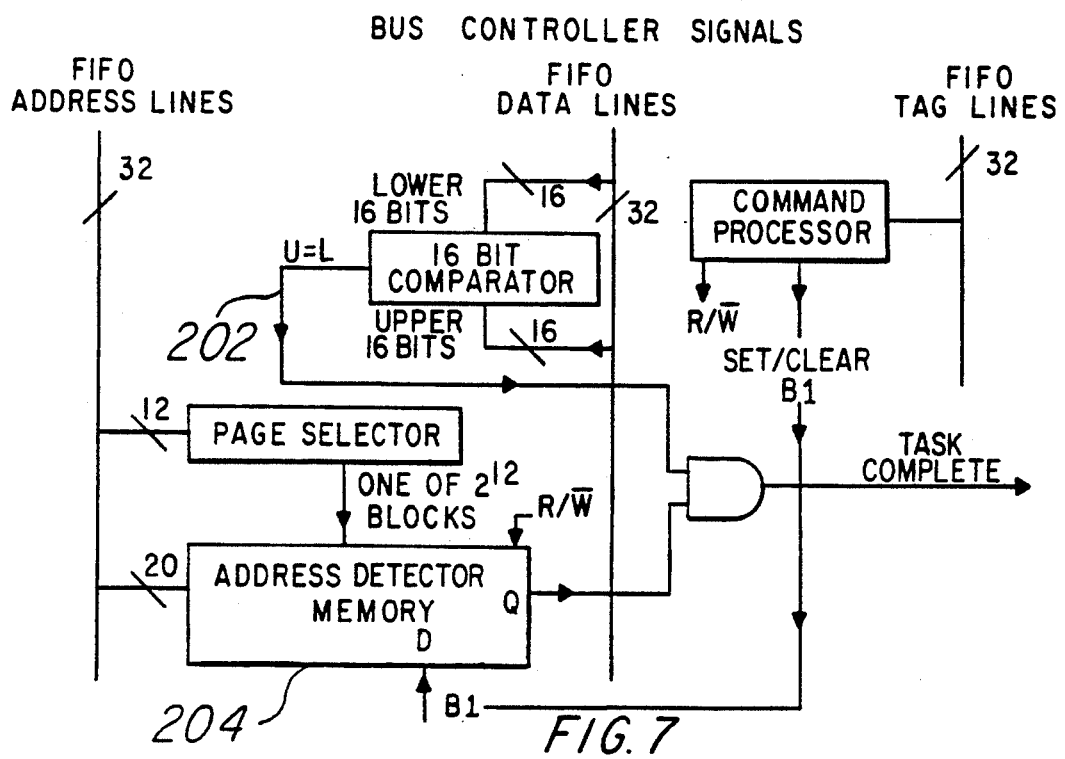
FIG. 7 shows the memory watcher.

The Memory Watcher subsystem provides hardware to alert each module to when a given multi-processor computation has completed. A comparator is placed on the data bus of the shared memory of each module; see FIG. 7. When the upper 16 bits of the 32-bit memory data bus matches the lower 16 significant bits of the same word, the comparator indicates the equality on a single output line 202. In addition to this comparator, there is a memory device provided whose address range spans a subset of the global memory space. This memory 204 is organized as $2^n$ by 1 bit as shown in FIG. 7. This memory is initially cleared so that each location holds a value of zero.

When a task requires synchronization, one of the memory locations spanned by the address detector is set to a logical one, and the respective global memory location is written with zeros in the 16 least significant bit locations, and a value of N in the upper significant bit locations where N is the total number of processes that must be completed for that task to complete. During execution of the task by the modules, the least significant 16 bits of the synchronization location are incremented as each process completes and as each process broadcasts a "increment-address" command over the broadcast bus. When a module completes its task, rather than wait until the N processes are completed, it can proceed with some other activity until the "task complete" interrupt condition occurs.

(d) Broadcast bus 160 links together the groups of processor modules on the backplanes 121, 122, ..., 135 through the expansion modules 141, 142, ..., 155. Broadcast bus 106 is 96 bits wide with each information unit on the bus including a 32-bit address, a 32-bit datum, and a 32-bit tag field. The tag field includes subfields that various modes of handling an information unit: one field specifies the mathematical operation (if any) that should be applied to the datum or address when the information unit arrives at a processing module, another subfield determines the extent of broadcast of the information unit (this also applies for further hierarchical structure as in the second preferred embodiment), and a third subfield indicates when information is to be exchanged only between a subset of the modules in a group. The use of the second and third tag subfields can reduce the volume of unnecessary communication over the bus. See FIG. 8a.

The range of broadcast of data over the Broadcast Bus is controlled by information contained in a Tag Field that is conveyed in parallel with the information transferred over this bus. Therefore, not all processors need receive valid copies of globally shared data at any one time during a calculation. For example, one group of processors, all co-resident on the same electrical backplane may be configured to solve one neural network algorithm, while a completely separate group of modules on different physical backplane may execute a totally distinct algorithm. In such a case, it is not necessary to fully copy all shared variables to all processors, and thus a savings in the time to share variable values may be proportionately increased.

Figure 8B:
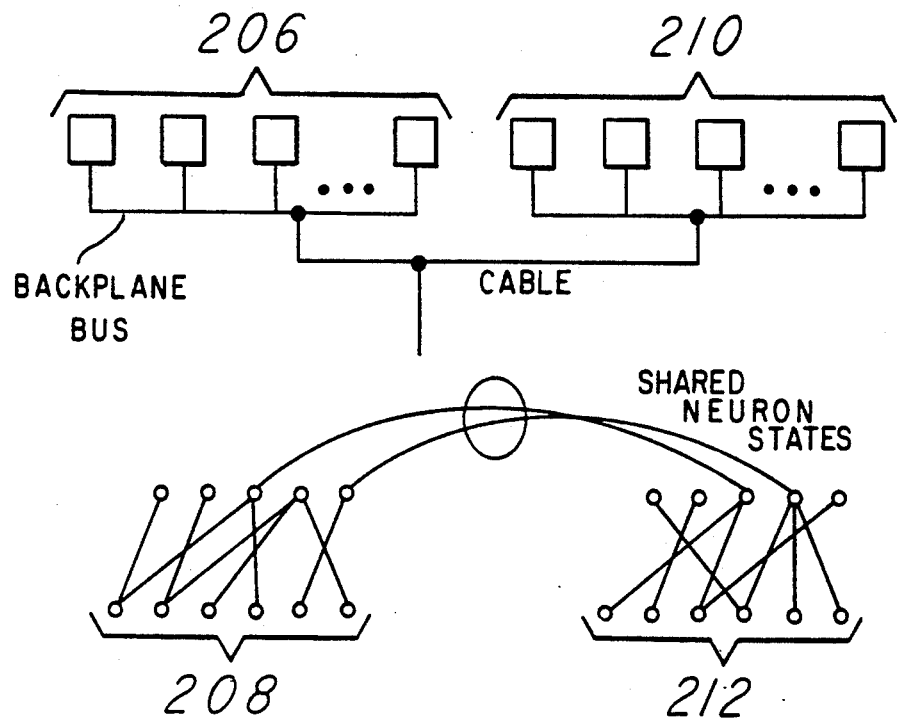
FIGS. 8a–b illustrate tag field use.
Figure 8A:
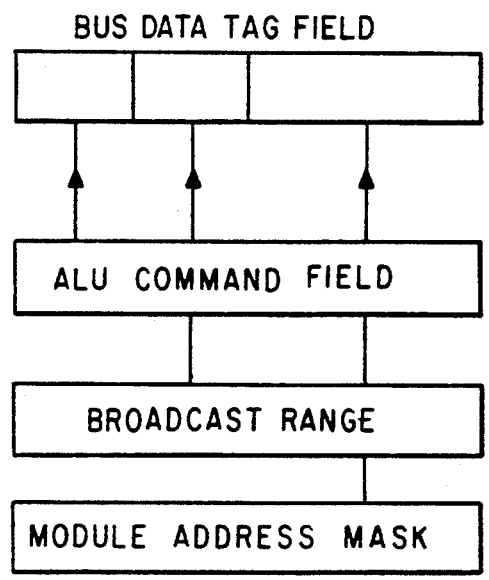

At the same time, there are often neural network models where the values of some fraction of the neurons in a network must be communicated to another network as shown heuristically in FIG. 8b. If one group of modules 206 is executing network 208 while another group of modules 210 is executing network 212, then only a small number of neuron values as computed by group 206 need be communicated, that is, broadcast to group 210. The tag field for the neurons shared between networks 208 and 212 would be programmed to be different from the field for the other neurons so that bus efficiency would be increased relative to the case where all information is always copied to all modules regardless of need.

Figure 9:
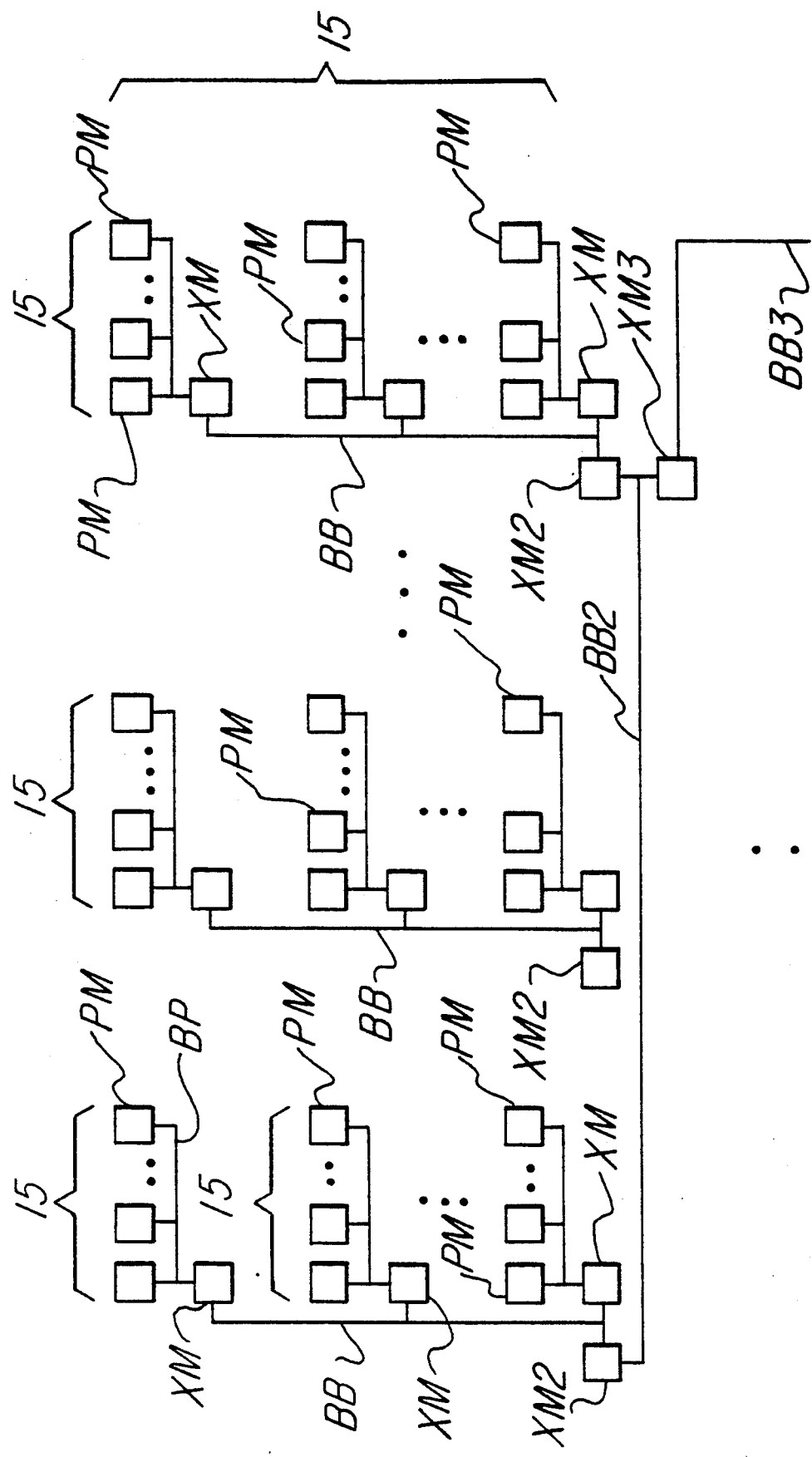
FIG. 9 illustrates a portion of the second preferred embodiment.

A second preferred embodiment computer is illustrated in block form in FIG. 9. The second preferred embodiment is essentially a grouping of copies of the first preferred embodiment by higher order broadcast busses. The expansion modules are the same for higher orders. This permits unlimited expansion of the computer. In particular, processing modules PM are in groups of fifteen on backplane busses BP, each backplane bus has an expansion module XM which connects the backplane bus to a broadcast bus BB. Again, fifteen backplanes busses are connected to each broadcast bus. Each broadcast bus has a second level expansion module XM2 which connects it to a second level broadcast bus BB2, again in groups of fifteen. Each second level broadcast bus has a third level expansion module XM3 which connects the second level broadcast busses to a third level broadcast bus in groups of fifteen. This hierarchy can be of any number of levels.

Figure 10A:
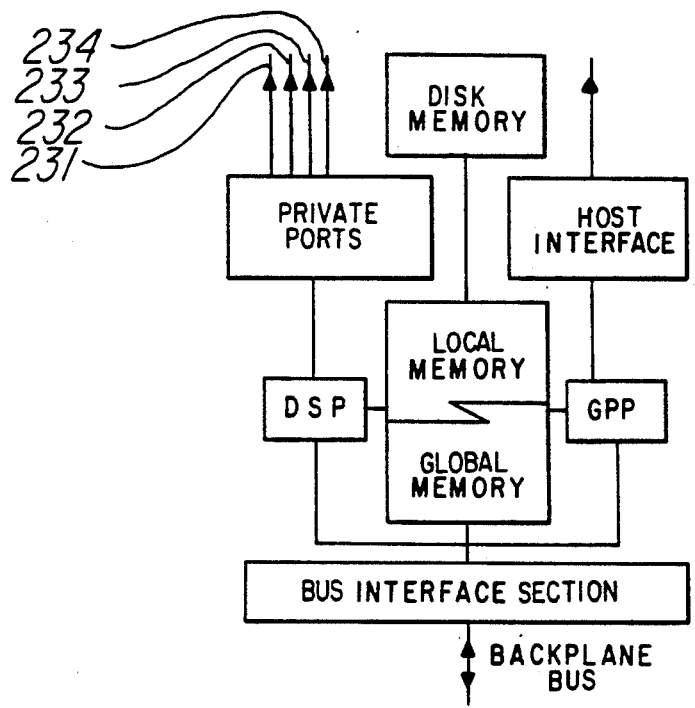
FIGS. 10a–b show a portion of the third preferred embodiment.
Figure 10B:
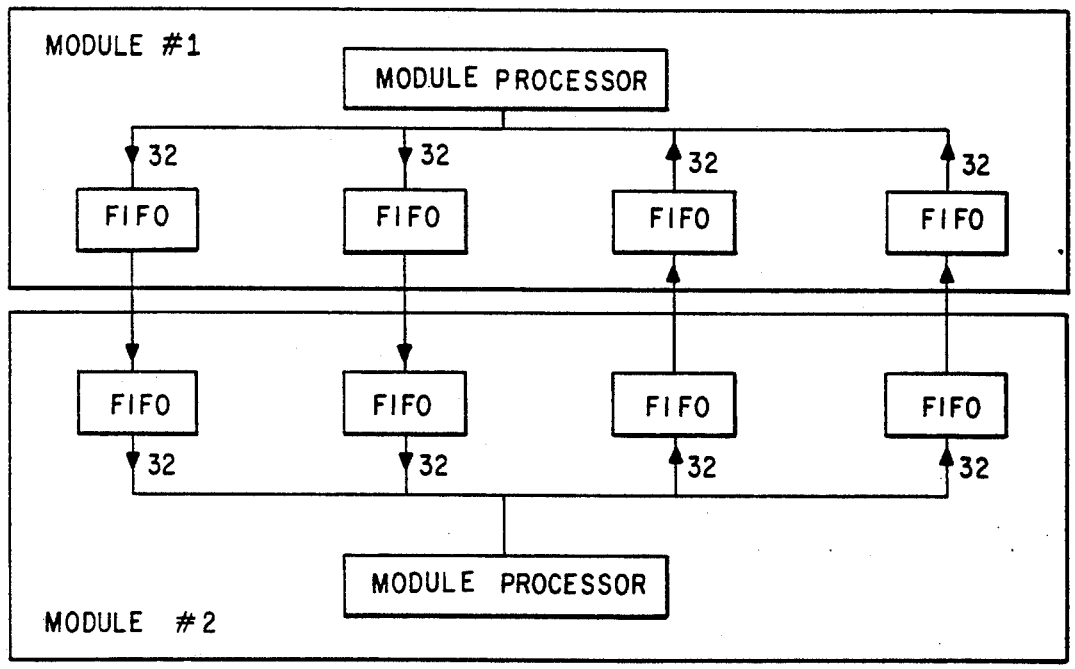

Third preferred embodiment computer is similar to the second preferred embodiment but also includes four parallel 64-bit wide ports 231, 232, 233, and 234 for each processor module; each port consists of two FIFOs and a simple state machine for moving data between modules. These ports permit more local intermodule connectivity as would be desired for certain neural network algorithms such as image processing with locally acting pixel operations designed to enhance shape or texture features in an image. FIG. 10a illustrates a processing module with four ports, and FIG. 10b illustrates a port connecting two modules.

MODIFICATIONS AND ADVANTAGES

Various modifications of the preferred embodiment devices and methods may be made while retaining the features of communication cost reduction. For example, the processors in the modules may be a single processor or include specialized computation hardware, the bus widths may be changed and have other-than-fifteen expansion factors, subsets of modules may be removed, and so forth.

What is claimed is:

1. A computation system for minimizing duplicate read requests comprising:
  (a) a plurality of processing systems within said computation system;
  (b) a broadcast bus connecting said plurality of processing systems;
  (c) wherein each one of said plurality of processing systems further include:
    i. a memory for storing variables;
    ii. circuitry operable for receiving incoming read requests through said broadcast bus from another processing system of said plurality of processing systems;
    iii. a memory for queuing said incoming read requests, wherein said memory for queuing said incoming read requests is connected to said circuitry operable for receiving said incoming read requests;
    iv. a memory for queuing outgoing read requests, wherein said memory for queuing outgoing read requests is connected to said broadcast bus and said memory for storing variables; and
    v. circuitry for comparing said incoming read requests to said queued read requests, wherein said circuitry compares said incoming read requests to addresses stored in a memory cache to determine whether said read requests are already stored in said memory cache, and wherein said circuitry adds non-duplicate read request to said memory cache and does not add duplicate read requests to said memory cache.

2. The system of claim 1, wherein said memory for queuing incoming read requests is a FIFO memory.

3. The system of claim 1, wherein said memory for queuing outgoing read requests is a FIFO memory.

4. The system of claim 1, wherein said non-duplicate read requests are deleted from said memory cache after said non-duplicate read request leaves said memory for queuing outgoing read requests.

5. The system of claim 1, wherein said broadcast bus includes:
  a. a plurality of data lines,
  b. a plurality of address lines, and
  c. a plurality of tag field lines.

6. The system of claim 1, wherein said each of said plurality of processing systems further include a plurality of processor modules connected to each other by a backplane bus.

7. The system of claim 1, wherein each one of said plurality of processing systems further include:
  a. a global memory;
  b. a memory watcher cache connected to said global memory;
  c. a controller connected to said global memory and said memory watcher cache; and
  d. an arithmetic logic unit connected to said controller, said global memory and said memory watcher cache.

8. The system of claim 7, wherein said controller manages bus protocols used to arbitrate access by each one of said plurality of processing systems to said broadcast bus.

9. The system of claim 7, wherein said arithmetic logic unit performs arithmetic on said global memory.

10. A computation system for minimizing duplicate read requests comprising:
  a. a plurality of processing systems;
  b. a broadcast bus connecting said processing systems;
  c. wherein each one of said plurality of processing systems further include:
    i. circuitry operable for receiving incoming read requests through said broadcast bus from another processing system of said plurality of processing systems;
    ii. a memory for queuing incoming read requests, wherein said memory for queuing said incoming read requests is connected to said circuitry operable for receiving said incoming read requests, wherein said memory for queuing incoming read requests is a FIFO memory;

iii. a memory for queuing outgoing read requests, wherein said memory for queuing outgoing read requests is connected to said broadcast bus and said memory for storing variables, wherein said memory for queuing outgoing read requests is a FIFO memory; and iv. circuitry for comparing said incoming read requests to said queued read requests, wherein said circuitry compares said incoming read requests to addresses stored in a memory cache to determine whether said read requests are already stored in said memory cache, and wherein said circuitry adds non-duplicate read request to said memory cache and does not add duplicate read requests to said memory cache.

11. The system of claim 10, wherein said non-duplicate read requests are deleted from said cache after said non-duplicate read request leaves said memory for queuing outgoing read requests.

12. The system of claim 10, wherein said broadcast bus includes:
   a. a plurality of data lines,
   b. a plurality of address lines, and
   c. a plurality of tag field lines.

13. The system of claim 10, wherein said each of said plurality of processing systems further include a plurality of processor modules connected to each other by a backplane bus.

14. The system of claim 10, wherein each one of said plurality of processing systems further include:
   a. a global memory;
   b. a memory watcher cache connected to said global memory;
   c. a controller connected to said global memory and said memory watcher cache, wherein said controller manages bus protocols used to arbitrate access by each one of said plurality of processing systems to said broadcast bus; and
   d. an arithmetic logic unit connected to said controller, said global memory and said memory watcher cache.

15. The system of claim 14, wherein said arithmetic logic unit performs arithmetic on said global memory.

16. A computation system for minimizing duplicate read requests comprising:
   a. a plurality of processing systems;
   b. a broadcast bus connecting said processing systems;
   c. wherein each one of said plurality of processing systems further include:
      i. circuitry operable for receiving read requests through said broadcast bus from another processing system of said plurality of processing systems;
      ii. a memory for queuing incoming read requests, wherein said memory for queuing said incoming read requests is connected to said circuitry operable for receiving said incoming read requests, wherein said memory for queuing incoming read requests is a FIFO memory;
      iii. a memory for queuing outgoing read requests, wherein said memory for queuing outgoing read requests is connected to said broadcast bus and said memory for storing variables, wherein said memory for queuing outgoing read requests is a FIFO memory; and
      iv. circuitry for comparing said incoming read requests to said queued read requests, wherein said circuitry compares said incoming read requests to addresses stored in a memory cache to determine whether said read requests are already stored in said memory cache, and wherein said circuitry adds non-duplicate read request to said memory cache and does not add duplicate read requests to said memory cache, and wherein said non-duplicate read requests are deleted from said cache after said non-duplicate read request leaves said memory for queuing outgoing read requests.

17. The system of claim 16, wherein said broadcast bus includes:
   a. a plurality of data lines,
   b. a plurality of address lines, and
   c. a plurality of tag field lines.

18. The system of claim 16, wherein each one of said plurality of processing systems further include:
   a. a global memory;
   b. a memory watcher cache connected to said global memory;
   c. a controller connected to said global memory and said memory watcher cache, wherein said controller manages bus protocols used to arbitrate access by each one of said plurality of processing systems to said broadcast bus; and
   d. an arithmetic logic unit connected to said controller, said global memory and said memory watcher cache, wherein said arithmetic logic unit performs arithmetic on said global memory.

19. The system of claim 16, wherein said each of said plurality of processing systems further include a plurality of processor modules connected to each other by a backplane bus.

* * * * *